(12) United States Patent
Weih et al.

(10) Patent No.: US 11,559,965 B2
(45) Date of Patent: Jan. 24, 2023

(54) SHAPED PART AND METHOD FOR PRODUCING A SHAPED PART

(71) Applicant: NOVEM Car Interior Design GmbH, Vorbach (DE)

(72) Inventors: Philipp Weih, Bayreuth (DE); Robert Krichenbauer, Floss (DE)

(73) Assignee: NOVEM CAR INTERIOR DESIGN GMBH, Vorbach (DE)

( * ) Notice: Subject to any disclaimer, the term of this patent is extended or adjusted under 35 U.S.C. 154(b) by 151 days.

(21) Appl. No.: 16/970,915

(22) PCT Filed: Feb. 19, 2019

(86) PCT No.: PCT/EP2019/054085
§ 371 (c)(1),
(2) Date: Aug. 18, 2020

(87) PCT Pub. No.: WO2019/162268
PCT Pub. Date: Aug. 29, 2019

(65) Prior Publication Data
US 2020/0391475 A1    Dec. 17, 2020

(30) Foreign Application Priority Data
Feb. 21, 2018   (DE) .................... 10 2018 103 919.0

(51) Int. Cl.
*B32B 3/30* (2006.01)
*B29C 39/10* (2006.01)
(Continued)

(52) U.S. Cl.
CPC ................ *B32B 3/30* (2013.01); *B29C 39/10* (2013.01); *B29C 45/14467* (2013.01);
(Continued)

(58) Field of Classification Search
CPC .. B32B 3/30; B60Q 3/14; B29C 39/10; B29C 45/14467; B60R 13/02; B60K 37/06; B60K 35/00
See application file for complete search history.

(56) References Cited

U.S. PATENT DOCUMENTS

| 5,555,161 A | * | 9/1996 | Roe ......................... F16H 63/42 362/555 |
| 5,744,210 A | * | 4/1998 | Hofmann ................ B29C 70/78 428/537.1 |

(Continued)

FOREIGN PATENT DOCUMENTS

| DE | 20201214088 U1 | 2/2013 |
| DE | 102012205411 A1 | 10/2013 |

(Continued)

*Primary Examiner* — Elmito Breval
*Assistant Examiner* — Nathaniel J Lee
(74) *Attorney, Agent, or Firm* — Workman Nydegger

(57) ABSTRACT

A shaped part can comprise an opaque decorative layer, at least two symbols on the front side, a translucent base, the decorative layer having one or more first light channels, one or more first functional having a first light element, a first functional layer on the rear side of the base, the first functional elements on the front side of the first functional layer, the decorative layer having one or more second light channels, one or more second functional elements having a second light element, a second functional layer on the rear side of the decorative layer, the second functional elements in or on the second functional layer, and being provided at least partially in the second light channels, the second functional elements covering the second light channels of the decorative layer such that the second light channels become or are shielded from light of the first light elements.

9 Claims, 1 Drawing Sheet

(51) Int. Cl.
*B29C 45/14* (2006.01)
*B60R 13/02* (2006.01)
*B60Q 3/14* (2017.01)
*B60K 37/06* (2006.01)
*B60K 35/00* (2006.01)
*B29L 31/30* (2006.01)

(52) U.S. Cl.
CPC .............. *B60K 35/00* (2013.01); *B60K 37/06* (2013.01); *B60Q 3/14* (2017.02); *B60R 13/02* (2013.01); *B29L 2031/3005* (2013.01); *B32B 2605/003* (2013.01)

(56) References Cited

U.S. PATENT DOCUMENTS

| | | | | |
|---|---|---|---|---|
| 8,264,142 | B2* | 9/2012 | Amelung | F21S 43/14 |
| | | | | 313/506 |
| 2002/0101738 | A1* | 8/2002 | Misaras | B60Q 3/745 |
| | | | | 362/85 |
| 2019/0001880 | A1* | 1/2019 | Schneider | B60Q 3/745 |

FOREIGN PATENT DOCUMENTS

| | | | |
|---|---|---|---|
| DE | 102016108451 | A1 | 11/2016 |
| DE | 102017100512 | A1 | 7/2017 |
| EP | 2218610 | A1 | 8/2010 |

\* cited by examiner

SHAPED PART AND METHOD FOR PRODUCING A SHAPED PART

CROSS-REFERENCE TO RELATED APPLICATIONS

The present invention is a 35 U.S.C. § 371 U.S. National Stage of PCT Application No. PCT/EP2019/054085, filed on Feb. 19, 2019, which claims priority to German Patent Application No. 10 2018 103 919.0, filed Feb. 21, 2018. The entire content of each of the aforementioned patent applications is incorporated herein by reference.

BACKGROUND OF THE INVENTION

1. Field of the Invention

The invention relates to a shaped part, in particular a decorative part and/or panel part designed as a shaped part for a vehicle interior. The invention further relates to a method for producing a shaped part, in particular a shaped part according to the invention.

2. The Relevant Technology

Numerous decorative and panel parts are installed in the vehicle interior, such as door panels, console panels, and instrument panels. The decorative and panel parts also include control buttons and their covers.

In the case of shaped parts in motor vehicles in particular, rear-lit or illuminated function symbols are shown on the front side of the decorative layer of the shaped parts. In the case of such function symbols, there are requirements to display different function symbols in different colors. This can mean that first function symbols are to be rear-lit or illuminated with a first light color and second function symbols with a second light color.

BRIEF SUMMARY OF THE INVENTION

The invention is based on the object of specifying a new shaped part, in particular a shaped part which at least largely meets the aforementioned requirements. Furthermore, it is an object of the invention to provide a novel method for producing a shaped part, in particular a method for producing a shaped part which at least largely meets the aforementioned requirements.

This object is achieved in terms of the shaped part by the features of claim 1 and in terms of the method by the features of claim 8. Advantageous refinements and developments are specified in the respective dependent claims.

The shaped part according to the invention, in particular a decorative part and/or a panel part for a vehicle interior formed as a shaped part, comprises an opaque decorative layer having a front side designed as a visible side and a rear side opposite the front side, at least two symbols being provided on the front side.

The shaped part further comprises a transparent or translucent base, with a base front side facing the rear side of the decorative layer and a base rear side.

The decorative layer has one or more first light channels for the transmission of light from the rear side of the decorative layer to the front side of the decorative layer which is designed as a visible side, the first light channels extending through the decorative layer and being provided for displaying a first symbol on the front side of the decorative layer.

The shaped part further comprises one or more first functional elements, each first functional element having a first light element, the first light elements being provided for illuminating the first light channels with a first light color for representing the first symbol on the front side of the decorative layer.

Furthermore, the shaped part comprises a first functional layer, in particular a functional film, with a front side facing the decorative layer, the first functional layer being provided on the rear side of the base, wherein the first functional elements are provided on the front side of the first functional layer.

The decorative layer furthermore has one or more second light channels for transmitting light from the rear side of the decorative layer to the front side of the decorative layer, which is designed as a visible side, the second light channels extending through the decorative layer and being provided for displaying a second symbol on the front side of the decorative layer.

The shaped part comprises one or more second functional elements, each second functional element having a second light element, the second light elements being provided for illuminating the second light channels with a second light color for representing the second symbol on the front side of the decorative layer.

Furthermore, the shaped part comprises a, preferably opaque, second functional layer, the second functional layer being provided on the rear side of the decorative layer, the second functional elements being provided in or on the second functional layer, and the second functional elements being provided on and/or at least partially in the second light channels, the second functional elements covering the second light channels of the decorative layer in such a way that the second light channels become or are shielded from light of the first light elements.

An advantage of the invention is in particular that different symbols can be rear-lit or illuminated in different colors. Furthermore, with the shaped part according to the invention it is possible, with a very slim structure of the shaped part, to seal off closely spaced symbols of scattered light from the respective other rear-lighting.

The decorative layer is preferably a wood veneer. The first light elements and/or the second light elements are or comprise preferably LEDs. The base is in particular a base made of PC and/or ABS. The first functional layer is preferably a functional film, for example made of PC and/or PES and/or PE.

Two or more symbols can represent a common symbol region on the front side of the decorative layer, for example to represent information for an observer.

The first light color and/or the second light color can be white or red light, for example.

A further development of the invention provides that the first functional layer has conductor tracks, the conductor tracks being provided for contacting the first functional elements. As an alternative or in addition, it can be provided that the second functional layer has conductor tracks, the conductor tracks being provided for contacting the second functional elements. The conductor tracks of the first functional layer and/or the conductor tracks of the second functional layer are preferably printed on the respective functional layer.

An embodiment variant of the invention provides that the first functional layer has a first contact element, in particular a contact tab, for connecting the first functional layer to an energy source. The energy source can be provided on or in the shaped part, in particular on the rear side of the shaped part. Alternatively, it can also be an external energy source.

According to a particularly preferred and advantageous development of the invention, at least one second contact element, in particular a metal spring, is provided between the first functional layer and the second functional layer for contacting the second functional layer with the first functional layer, the second contact element being provided in the base, in particular poured or injected.

The second contact element is preferably provided for connecting the second functional layer to the energy source, the contacting being provided, for example, as an intermediate contact via the first functional layer.

According to one embodiment variant of the invention, the first functional elements and/or the second functional elements are arranged, at least partially, in or on the base, in particular cast or injected.

It can be provided that a, in particular transparent or translucent, protective, and/or optical layer is provided on the front side of the decorative layer.

It can further be provided that at least some of the first functional elements and/or at least some of the second functional elements each have at least one sensor element. The sensor element can be, for example, a proximity or touch sensor, in particular capacitive proximity sensors or resistive systems. The sensor elements are provided, for example, to implement one or more switching elements for a user.

The method according to the invention for producing a shaped part, in particular a shaped part according to the invention, the shaped part having an opaque decorative layer having a front side designed as a visible side and a rear side opposite the front side, at least two symbols being provided on the front side and comprising a transparent or translucent base with a base front side facing the rear side of the decorative layer and a base rear side, having a production tool, the method comprising the steps of:

providing an opaque decorative material provided as a decorative layer, introducing one or more first light channels into the decorative material, so that the first light channels extend through the decorative material from the side of the decorative material provided as the rear side of the decorative layer to the front side provided as the visible side, introducing one or more second light channels into the decorative material, so that the second light channels extend through the decorative material from the side of the decorative material provided as the rear side of the decorative layer to the front side provided as the visible side, providing a, preferably opaque, second functional layer on the side of the decorative material provided as the rear side of the decorative layer, providing one or more second functional elements in or on the second functional layer, the second functional elements being provided on and/or at least partially in the second light channels, so that the second functional elements cover the second light channels of the decorative material provided as a decorative layer, providing a first functional layer, one or more first functional elements being provided on a side of the first functional layer provided as a front side, inserting or placing the composite of decorative material and second functional layer with one or more second functional elements into the production tool, inserting or placing the first functional layer with one or more first functional elements into the production tool such that the front side of the first functional layer is facing the side of the decorative material provided as the rear side of the decorative layer, and wherein the composite of decorative material and second functional layer having one or more second functional elements on the one hand and the first functional layer on the other hand are or become spaced apart from one another, injecting or pouring a transparent or translucent base material to form the base between the composite of decorative material and second functional layer having one or more second functional elements on the one hand and the first functional layer on the other, wherein the base material connects the composite of decorative material and second functional layer to second functional elements on the one hand and the first functional layer on the other hand, curing the base material, removing the shaped part from the production tool.

A particularly advantageous development of the method according to the invention provides that before injecting or pouring in the base material to form the base, at least one second contact element is provided for contacting the second functional layer with the first functional layer between the composite of decorative material and the second functional layer with one or more second functional elements on the one hand and the first functional layer on the other, wherein the second contact element is then poured or injected into the base.

Furthermore, it can be provided that a, in particular transparent or translucent, protective, and/or optical layer is provided, in particular cast or sprayed, on the front side of the decorative layer or on the side of the decorative material provided as the front side of the decorative layer.

Provision can also be made that when the base material is injected or poured in to form the base, the first functional elements and/or the second functional elements are embedded at least partially in or on the base.

BRIEF DESCRIPTION OF THE DRAWINGS

The invention is explained in more detail below also with regard to further features and advantages on the basis of the description of exemplary embodiments and with reference to the accompanying schematic drawing. In the figures.

Corresponding parts and components, also across the various exemplary embodiments, are each identified by the same reference symbols.

DETAILED DESCRIPTION OF THE PREFERRED EMBODIMENTS

Figure 1:
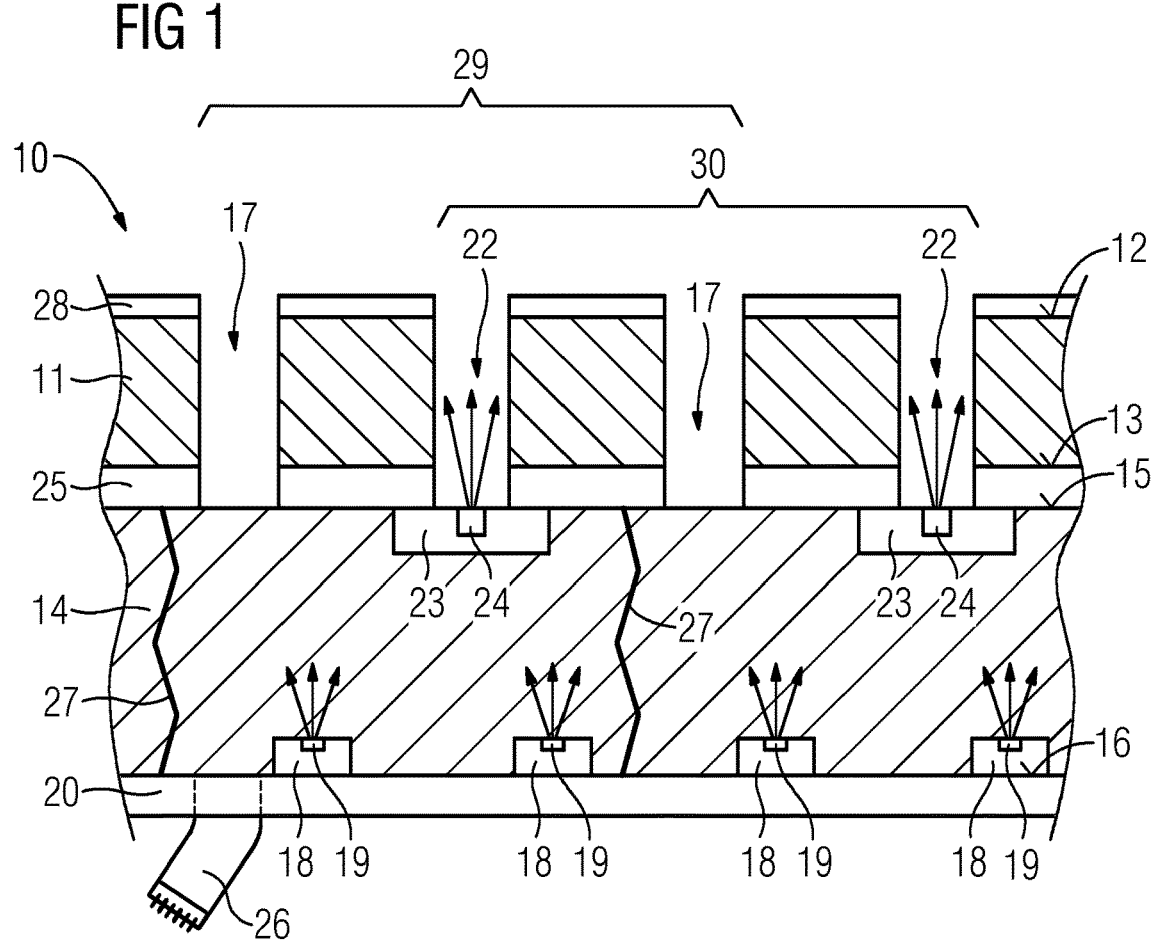
FIG. 1 is a schematic cross-sectional representation of an enlarged section of a first exemplary embodiment of a shaped part according to the invention.

The decorative and/or panel part designed as a shaped part 10 according to FIG. 1 comprises an opaque decorative layer 11 having a front side 12 designed as a visible side and a rear side 13 opposite the front side 12, two symbols 29; 30 being provided on the front side 12.

The shaped part 10 further comprises a transparent or translucent base 14, with a base front side 15 facing the rear side 13 of the decorative layer 11 and a base rear side 16.

Figure 2:
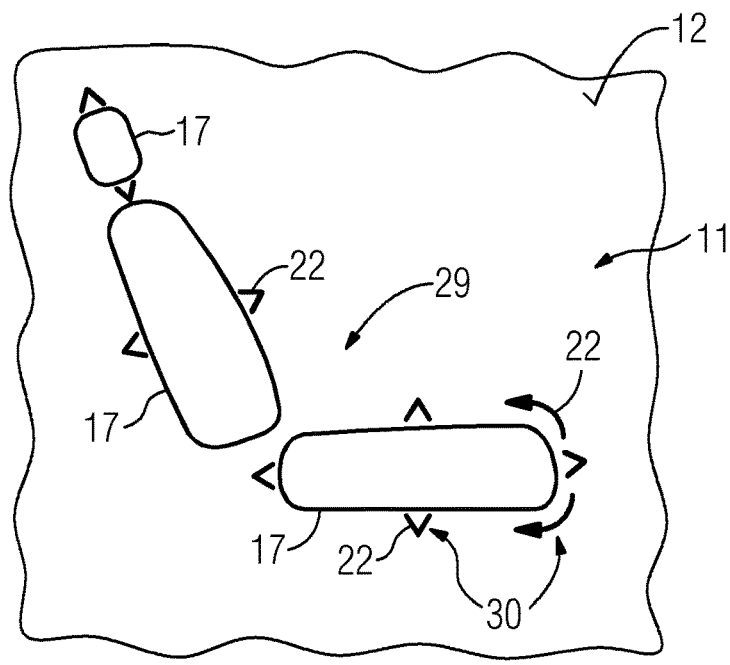
FIG. 2 is a schematic representation of the top view of a section of the front side of the decorative layer of a second exemplary embodiment of a shaped part according to the invention.

The decorative layer 11 has a plurality of first light channels 17 for transmitting light from the rear side 13 of the decorative layer 11 to the front side 12 of the decorative layer 11, which is designed as a visible side, the first light channels 17 extending through the decorative layer 11 and being provided on the front side 12 of the decorative layer 11 for representing a first symbol 29, such as for example the symbol in FIG. 2.

The shaped part 10 comprises a plurality of first functional elements 18, each first functional element 18 having a first light element 19, wherein the first light elements 19 are provided on the front side 12 of the decorative layer 11 for illuminating the first light channels 17 with a first light color for representing the first symbol 29.

Furthermore, the shaped part 10 comprises a first functional layer 20 formed as a functional film and having a front side 21 facing the decorative layer 11, the first functional layer 20 being provided on the base rear side 16 and the first functional elements 18 being provided on the front side 21 of the first functional layer 20.

The decorative layer 11 has a plurality of second light channels 22 for transmitting light from the rear side 13 of the decorative layer 11 to the front side 12 of the decorative layer 11, which is designed as a visible side, the second light channels 22 extending through the decorative layer 11 and being provided on the front side 12 of the decorative layer 11 for representing a second symbol 30, such as for example the second symbol 30 in FIG. 2.

The shaped part 10 further comprises a plurality of second functional elements 23, each second functional element 23 having a second light element 24, wherein the second light elements 24 are provided on the front side 12 of the decorative layer 11 for illuminating the second light channels 22 with a second light color for representing the second symbol 30.

In addition, the shaped part 10 comprises an opaque, second functional layer 25, the second functional layer 25 being provided on the rear side 13 of the decorative layer 11, the second functional elements 23 being provided in the second functional layer 25, and the second functional elements 23 being provided on the second light channels 22, the second functional elements 23 covering the second light channels 22 of the decorative layer 11 in such a way that the second light channels 22 are shielded from light of the first light elements 19.

The first functional layer 20 has printed conductor tracks, the conductor tracks being provided for contacting the first functional elements 18. The second functional layer 25 also has printed conductor tracks, which are provided for contacting the second functional elements 23.

The first functional layer 20 has a first contact element 26 designed as a contact tab, which is provided for connecting the first functional layer 20 to an energy source.

Two second contact elements 27 for contacting the second functional layer 25 with the first functional layer 20 are provided between the first functional layer 20 and the second functional layer 25. The second contact elements 27 are metal springs. The second contact elements 26 are cast or injected into the base. The second contact elements 26 are provided for connecting the second functional layer 25 to the energy source, the contacting via the first functional layer 20 being provided as an intermediate contact.

The first functional elements 18 and the second functional elements 23 are also cast or injected into the base 14. A transparent or translucent protective and/or optical layer 28 is provided on the front side 12 of the decorative layer 11.

The first functional elements 18 and the second functional elements 23 each have a sensor element in order to implement a switch for a user.

FIG. 2 shows a schematic representation of the top view of a section of the front side 12 of the decorative layer 11 of a second exemplary embodiment of a shaped part 10 according to the invention.

In the top view, two symbols 29, 30 are shown, which form a common symbol region. The first symbol 29 is the stylized representation of a vehicle seat and the second symbol 30 is the stylized representation of directions of movement or setting options of the vehicle seat by means of arrows. The symbols 29, 30 are formed by the light channels 17, 22 extending through the decorative layer 11, the first light channels 17 forming the first symbol 29 on the front side 12 of the decorative layer 11 and the second light channels 22 forming the second symbol 30 on the front side 12 of the decorative layer 11. The symbols 29, 30 particularly emerge from the fact that the light channels 17, 20 are illuminated by means of the light elements 19, 24. Thus, the first symbol 29 appears by means of the illumination by the first light element 19 with a first, white light color in the same white light color, whereas the second symbol appears in red by means of the illumination by the second light element 24 with a second, red light color.

LIST OF REFERENCE NUMBERS 10 shaped part
11 decorative layer
12 front side
13 rear side
14 base
15 base front side
16 base rear side
17 first light channel
18 first functional elements
19 first light element
20 first functional layer
21 front side
22 second light channel
23 second functional elements
24 second light element
25 second functional layer
26 first contact element
27 second contact element
28 protective and/or optical layer
29 first symbol
30 second symbol

We claim:
1. A shaped part comprising:
an opaque decorative layer having a front side designed as a visible side and a rear side opposite the front side, at least two symbols being provided on the front side;
a base that is transparent or translucent, the base having a base front side facing the rear side of the decorative layer and a base rear side, wherein the decorative layer has one or more first light channels disposed therein, and for passing light from the rear side of the decorative layer to the front side of the decorative layer, wherein each first light channel extends through the decorative layer and represents a first symbol on the front side of the decorative layer;
one or more first functional elements, each first functional element having a first light element, wherein each first light element is provided for illuminating the first light channels with a first light color representing the first symbol on the front side of the decorative layer;
a first functional layer formed as a functional film having a front side facing the decorative layer, the first func- tional layer being provided on the base rear side, the first functional elements being provided on the front side of the first functional layer;

one or more second light channels disposed in the decorative layer, the one or more second light channels provided for transmitting light from the rear side of the decorative layer to the front side of the decorative layer, wherein the second light channels extend through the decorative layer and represent a second symbol on the front side of the decorative layer;

one or more second functional elements, each second functional element having a second light element, wherein each second light element is provided for illuminating the second light channels with a second light color for representing the second symbol on the front side of the decorative layer;

a second functional layer, the second functional layer being provided on the rear side of the decorative layer, the second functional elements being provided in or on the second functional layer, and the second functional elements being provided on or at least partially in the second light channels, the second functional elements covering the second light channels of the decorative layer in such a way that the second light channels are shielded from light of the first light elements;

wherein:

the first functional elements and the second functional elements are cast or injected at least partially in the base, the second functional layer has conductor tracks, the conductor tracks being provided for contacting the second functional elements, and at least one second contact element for contacting the second functional layer with the first functional layer is provided between the first functional layer and the second functional layer; and the second contact element is cast or injected in the base.

2. The shaped part according to claim 1, wherein:
the first functional layer has conductor tracks, the conductor tracks being provided for contacting the first functional elements.

3. The shaped part according to claim 1, wherein:
the first functional layer has a first contact element for connecting the first functional layer to an energy source.

4. The shaped part according to claim 1, wherein:
a protective and/or optical layer is provided on the front side of the decorative layer.

5. The shaped part according to claim 1, wherein:
that at least some of the first functional elements and/or at least some of the second functional elements each have at least one sensor element.

6. A method for producing a shaped part, wherein the shaped part has an opaque decorative layer with a front side designed as a visible side and a rear side opposite the front side, at least two symbols being provided on the front side and comprising a transparent or translucent base with a base front side facing the rear side of the decorative layer and a base rear side, having a production tool, the method comprising the steps of:

providing an opaque decorative material provided as a decorative layer;

introducing one or more first light channels into the decorative material having a front side and a rear side, wherein the first light channels: (i) extend through the decorative material from the rear side to the front side thereof, and (ii) represent a first symbol on the front side of the decorative layer;

introducing one or more second light channels into the decorative material, wherein the second light channels (i) extend through the decorative material from the to the front side thereof, and (ii) represent a second symbol on the front side of the decorative layer;

providing a second functional layer on the rear side of the decorative layer;

providing one or more second functional elements in or on the second functional layer, the second functional elements being provided on or—at least partially in the second light channels, wherein the second functional elements cover the second light channels of the decorative material;

providing a first functional layer, wherein one or more functional elements are provided on a front side of the first functional layer;

placing a composite of the decorative material and the second functional layer into the production tool;

inserting the first functional layer and first functional elements into the production tool, such that the front side of the first functional layer is facing the rear side of the decorative layer, wherein the composite of decorative material and second functional layer on the one hand and the first functional layer on the other hand are spaced apart from one another;

injecting or pouring a transparent or translucent base material to form the base between the composite of decorative material and second functional layer on the one hand and the first functional layer on the other, wherein the base material connects the composite of decorative material and second functional layer to one or more second functional elements on the one hand and the first functional layer on the other hand;

curing the base material;

removing the shaped part from the production tool;

wherein:

the first functional elements and the second functional elements are cast or injected at least partially in the base, the second functional layer has conductor tracks, the conductor tracks being provided for contacting the second functional elements, at least one second contact element for contacting the second functional layer with the first functional layer is provided between the first functional layer and the second functional layer; and the second contact element is cast or injected in the base.

7. The method according to claim 6, wherein:
before injecting or pouring in the base material to form the base, at least one second contact element is provided for contacting the second functional layer with the first functional layer between the composite of decorative material and the second functional layer with of the one or more second functional elements on the one hand and the first functional layer on the other.

8. The method according to claim 6, wherein:
a protective and/or optical layer is provided on the front side of the decorative layer.

9. The method according to claim 6, wherein:
when the base material is injected or poured in to form the base, the first functional elements and/or the second functional elements are embedded at least partially in or on the base.

* * * * *